(No Model.)
A. SCHENK.
SPRING MATTRESS.
No. 252,973. Patented Jan. 31, 1882.
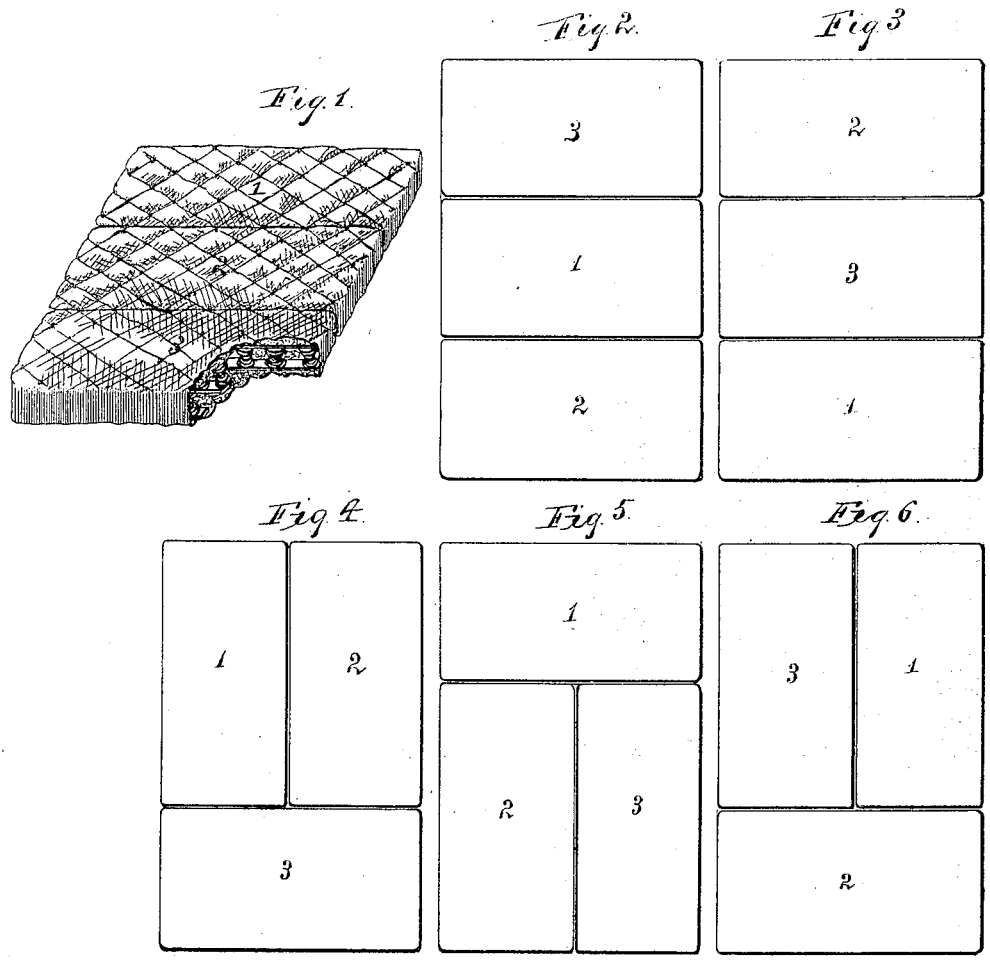

UNITED STATES PATENT OFFICE.

ADAM SCHENK, OF MILWAUKEE, WISCONSIN.

SPRING-MATTRESS.

SPECIFICATION forming part of Letters Patent No. 252,973, dated January 31, 1882.

Application filed October 25, 1881. (No model.)

*To all whom it may concern:*

Be it known that I, ADAM SCHENK, of Milwaukee, in the county of Milwaukee, and in the State of Wisconsin, have invented certain new and useful Improvements in Spring-Mattresses; and I do hereby declare that the following is a full, clear, and exact description thereof.

My invention relates particularly to spring-beds; and it consists in making them in two or more sections, for a purpose that will hereinafter be fully explained.

In the drawings, Figure 1 is a perspective view of a spring-bed embodying my invention, and the remaining figures are plan views of the same, showing the various changes I may make in the relative positions of the sections that compose the bed.

Beds have, as far as I have been informed, previous to this my invention been made entirely in one piece, and while they have been made reversible, so as to permit of their being turned from head to foot, still the wear has always been in the direction of their length, and if occupied by one person they in time sink on the side which the person habitually occupies, and if by two persons they sink on each side, leaving a central ridge. My invention obviates this, since I make my bed of three sections, 1 2 3, of equal dimensions, and therefore interchangeable. I may arrange them at right angles to the bedstead in the order shown in Fig. 1 for one use, and for the next in the order shown in Fig. 2, and next in that shown in Fig. 3. After that I can arrange them as shown in Figs. 4, 5, and 6, and then return to the first arrangement, and thus bring the wear upon all of the sections alike, so that the bed will be as level when worn out as it was when entirely new.

I may find it expedient at times to make my beds in only two sections. In that case I would make one section perfectly square and the other of a length equal to one of the sides of the square. In other words, I would combine sections 1 and 2 and fill out the length of the bedstead with section 3. Then the larger section could be turned to present a different side to the head of the bed after each use, and likewise the smaller section might be reversed.

I am aware that heretofore beds have been made in several pieces, the center of which was filled with hair, while the top and bottom pieces were filled with palm-leaf or other coarse material, and then the whole joined together, the object being to save expense in picking over or refilling the central portion, where the greatest wear comes; but in such cases none of these parts, so far as known to me, were seperable or interchangeable, and consequently the wear all came upon the central piece instead of being distributed equally upon all pieces, changed about in position from day to day, as in my device, and this constitutes the chief feature of my invention.

What I claim as my invention, and desire to secure by Letters Patent, is—

1. A bed composed of interchangeable sections, as and for the purposes set forth.

2. A bed composed of interchangeable sections of equal dimensions, as set forth.

3. The combination, in a spring-bed, of sections 1, 2, and 3, arranged as shown, and adapted to be interchanged in position at will, whereby the wear will be distributed equally upon all portions of the mattress.

In testimony that I claim the foregoing I have hereunto set my hand this 17th day of October, 1881.

ADAM SCHENK.

Witnesses:
 S. S. STOUT,
 HAROLD G. UNDERWOOD.